United States Patent [19]
McLaughlin et al.

[11] Patent Number: 5,258,116
[45] Date of Patent: Nov. 2, 1993

[54] METHOD FOR REDUCING TURNAROUND TIME OF HYDROPROCESSING UNITS

[75] Inventors: Bruce D. McLaughlin, Sewell, N.J.; Tsoung Y. Yan, Philadelphia, Pa.

[73] Assignee: Mobil Oil Corporation, Fairfax, Va.

[21] Appl. No.: 856,266

[22] Filed: Mar. 23, 1992

[51] Int. Cl.$^5$ ............................................. C10G 45/00
[52] U.S. Cl. ...................... 208/154; 208/143
[58] Field of Search ................ 208/154, 143

[56] References Cited

U.S. PATENT DOCUMENTS

| | | | |
|---|---|---|---|
| 4,053,390 | 10/1977 | James | 208/143 |
| 4,510,044 | 4/1985 | Oleck et al. | 208/111 |
| 4,518,485 | 5/1985 | LaPierre et al. | 208/89 |
| 4,548,709 | 10/1985 | Bowes et al. | 208/213 |
| 4,600,503 | 7/1986 | Angevine et al. | 208/251 |
| 4,696,732 | 9/1987 | Angevine et al. | 208/111 |

OTHER PUBLICATIONS

"The Effect of Outgassing Cycles on the Hydrogen Content in Petrochemical-Reactor-Vessel Steels", T. P. Groeneveld and R. R. Fessler, API Pub. No. 946, Jul. 1981.

"Material Problems in the Hydrocarbon Processing Industries" G. R. Prescott, Met. Prog., 120 (2) 24–30 (Jul. 1981).

"Hydrogen-Induced Disbonding of Stainless Weld Overlay Found in Desulfurizing Reactor" Watanabe et al. Proceedings of the First International Conference on Current Solutions to Hydrogen Problems in Steels, Washington, D.C., Nov. 1–5, 1982 (American Society for Metals).

*Primary Examiner*—Theodore Morris
*Assistant Examiner*—Walter D. Griffin
*Attorney, Agent, or Firm*—Alexander J. McKillop; Dennis P. Santini; Robert B. Furr, Jr.

[57] ABSTRACT

The present invention relates a method for decreasing the time required for degassing a hydroprocessing reactor fabricated from a base metal with or without an alloy overlay.

12 Claims, 3 Drawing Sheets

METHOD FOR REDUCING TURNAROUND TIME OF HYDROPROCESSING UNITS

FIELD OF THE INVENTION

The present invention relates to hydroprocessing, and more particularly relates to a method for decreasing unit turnaround time; this is accomplished by reducing the time required for hydrogen outgassing of the hydroprocessing reactor which is fabricated from a ferritic base metal and may have an austenitic alloy overlay.

BACKGROUND OF THE INVENTION

Operating at high-temperature and high-pressure, the thick wall of a hydroprocessing reactor is saturated with atomic hydrogen. When the reactor is cooled rapidly, the vessel wall becomes supersaturated with hydrogen; this can cause base-metal cracking and/or overlay disbonding which are forms of reactor damage. To avoid damage, the wall must be "outgassed" before cooling to the critical temperature. Historically, outgassing has been slow and may require more than one week depending on operating conditions and the geometry and properties of the vessel wall. This lengthens the turnaround time and reduces the productivity and profitability of the process operation. Conventional outgassing involves: (a) slowly lowering the reactor temperature from process operating temperature to ambient temperature and (b) gradual hydrogen depressurization only after the temperature drops to about 575° K. to prevent coking the hydroprocessing catalyst contained in the reactor. Actual cooling rates and depressurization rates are largely trial and error since, during the cooldown period, the operator will have only limited knowledge of the transient hydrogen concentration profile across the reactor wall.

The problems of hydrogen blistering and overlay disbonding are well known in the refining industry. For a discussion of outgassing and hydrogen content in reactor steels, see The Effect of Outgassing Cycles on the Hydrogen Content in Petrochemical-Reactor-Vessel Steels, API Publication 946 (Jul. 1981); Hydrogen-Induced Disbonding of Stainless Weld Overlay Found in Desulfurizing Reactor, J. Watanabe, Performance of Pressure Vessels With Clad and Overlayed Stainless Steel Linings, Denver, Colo., 21–25 (June 1981), ASME, 8212-72-0542; Material Problems in the Hydrocarbon Processing Industry, G. R. Prescott, Met. Prog., 120, (2) 24–30 (July 1981); A Safety Analysis on Overlay Disbonding of Pressure Vessels for Hydrogen Service, T. Fujii, *Current Solutions to Hydrogen Problems in Steels*, Washington, D.C., 361–368 (November 1982), ASM, 8303-72-0154.

SUMMARY OF THE INVENTION

The present invention provides an outgassing method which decreases process unit stream time lost during conventional outgassing. The invention provides a method reducing outgassing time without (a) generation of excessive thermal stress in vessel walls, (b) damage to catalyst, (c) overlay disbonding or (d) the initiation and propagation of cracks in base-metal. Reduction of outgassing time can result in significant productivity increase and cost savings by reducing unit downtime.

The primary object of the invention is to outgas the reactor wall as rapidly as possible.

A second object of the invention is to maintain thermal stresses within a tolerable range during the entire outgassing period.

A third object of the invention is to avoid catalyst damage by such mechanisms as coke formation and reduction of the pre-sulfide layer.

A fourth object of the invention is to control the hydrogen concentration ($C_o$) in the overlay (if present), at the base-metal/overlay interface, at or below the critical value for overlay at this location ($C_{oc}$) whenever the temperature is below the critical temperature ($T_c$).

A fifth object of the invention is to control the hydrogen concentration ($C_b$) in the base-metal at or below the critical value for base-metal ($C_{bc}$) whenever the temperature is below the critical temperature ($T_c$).

The present invention provides a method for cooling and outgassing a hydroprocessing reactor comprising the steps of:

(a) providing a vessel fabricated from ferritic base metal which may or may not be overlayed with austenitic alloy, said vessel wall containing diffused hydrogen from contact with a hydrogen-containing reaction mixture at operating temperature $T_o$ and hydrogen partial pressure $P_o$;

(b) raising the temperature of the inside surface of said vessel from $T_o$ to $T_m$ at rate $R_T$ where $T_m$ is equal to or less than the maximum safe operating temperature for said vessel and $R_T$ is less than the rate of temperature change required to effect mechanical failure of the ferritic base metal or the austenitic alloy overlay, if present;

(c) concurrently with step (b), reducing the hydrogen partial pressure from $P_o$ at an average rate of at least $P_o R_T/(T_m - T_o)$;

(d) concurrently with steps (b) and (c), flushing said catalyst bed with a hydrocarbon liquid at liquid hourly space velocity (LHSV) sufficient to achieve at least one catalyst bed volume of flushing by the time the temperature reaches $T_m$; and (e) maintaining the inside surface of said vessel at temperature $T_m$ for time of about $t_m$ then lowering the temperature of the inside surface from $T_m$ to ambient $T_a$ at rate $R_T$ wherein the value $t_m$ is minimum time to produce $C_o < C_{oc}$ and $C_b < C_{bc}$ for all temperatures less than $T_c$, with the proviso that if no austenitic alloy overlay is present then only the criterion $C_b < C_{bc}$ is met.

The method of the present invention surprisingly decreases the total time required for cooling and outgassing a hydroprocessing reactor by initially heating the vessel. The method protects the hydroprocessing catalyst from damage during the outgassing process by flowing a substantially non-coking hydrocarbon liquid through the hydroprocessing reactor vessel. The method has been found to reduce outgassing time by more than 400% when compared with conventional procedures.

DETAILED DESCRIPTION

Figure 1:
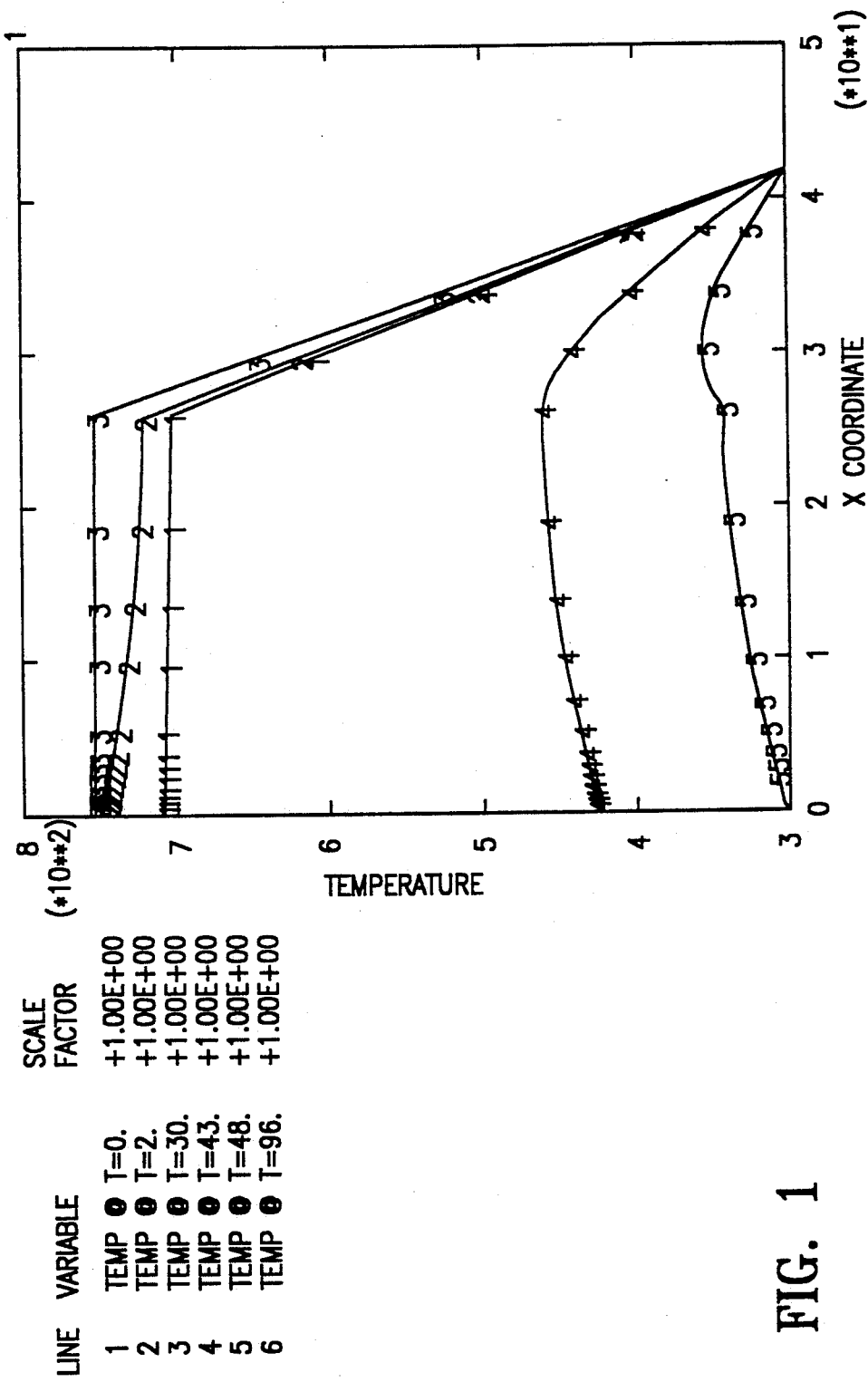
FIG. 1 is a plot of the trial temperature-time profile given in Table 1. The x-axis represents the radial depth in the overlay (cm) with the intersection of the x- and y-axes representing the inside diameter of the overlay, and the y-axis represents temperature (°K.).

The present invention provides a method for outgassing a hydroprocessing vessel in minimum time in a manner consistent with the objects of the invention as set forth above. The terms "hydroprocessing" and "hydrotreating" are used herein to refer to any conversion process which reacts a feedstock in the presence of hydrogen at elevated temperature and pressure, examples of which processes include catalytic hydrotreating, hydrocracking, catalytic reforming, desulfurization, and catalytic hydrogenation. The following U.S. patents teach examples of hydrotreating processes, and are incorporated by reference as if set forth at length herein.

U.S. Pat. No. 4,696,732 discloses a process for simultaneously hydrotreating and dewaxing petroleum fractions. U.S. Pat. No. 4,600,503 teaches a method for hydrotreating residual oil with a thermally stable composition comprising a layered metal oxide. U.S. Pat. No. 4,548,709 describes the demetalation and desulfurization of residual oils by adding the oil to an aromatic solvent and contacting the mixture in the presence of hydrogen with an alumina having dual pore size distribution in the ranges of 90 to 200 Angstrom units and 1000 to 5000 Angstrom units. U.S. Pat. No. 4,518,485 teaches a process for dewaxing a hydrocarbon feedstock with a relatively high pour point in the presence of a zeolite Beta catalyst. U.S. Pat. No. 4,510,044 teaches single stage hydrodewaxing and hydrotreating.

The hydrotreating reactor may be flushed with any suitable normally liquid hydrocarbon stream having sufficient flowability under the outgassing temperature and pressure conditions to effectively transfer heat from the hydrotreating reactor and catalyst bed while avoiding damage to the hydrotreating catalyst. Examples of suitable hydrocarbon liquids include naphthas and gasolines, preferably a naphtha such as a catalytic reformer feedstock characterized by a boiling endpoint of less than about 400° F.

The method of the present invention is suitably carried out as follows:

(a) Begin with a vessel fabricated from ferritic base metal which may or may not be overlayed on the ID with austenitic stainless steel. The vessel wall contains diffused hydrogen from contact with a hydrogen-containing reaction mixture at operating temperature ($T_o$) and hydrogen partial pressure $P_o$.

(b) Raise the temperature of the vessel wall ID, at the maximum rate of temperature change ($R_T$) consistent with the need to maintain acceptable thermal stresses, from the operating temperature ($T_o$) to the highest temperature practical ($T_m$); for simplicity, $R_T$ can be viewed as a constant.

(c) Concurrently with step (b), reduce the hydrogen partial pressure at an average rate equal to or greater than $P_o R_T/(T_m-T_o)$; adjustments to process conditions will be necessary to ensure depressurization is conducted without damaging any catalyst contained in the reactor. The hydrogen partial pressure is preferably reduced to as low a level as possible, and is more preferably reduced to about zero.

(d) Concurrently with steps (b) and (c), flush the reactor with light hydrocarbon using a liquid hourly space velocity (LHSV) sufficient to achieve at least one bed volume of flushing by the time the temperature reaches $T_m$.

(e) Maintain the wall ID at temperature $T_m$ for a time $t_m$, then lower the temperature of the vessel wall ID, at rate $R_T$, from $T_m$ to ambient ($T_a$). To control the hydrogen concentration ($C_o$) in the overlay, at the base-metal/overlay interface, at or below the critical value for overlay at this location ($C_{oc}$) whenever the temperature is below the critical temperature ($T_c$), while also controlling the hydrogen concentration ($C_b$) in the base-metal at or below the critical value for base-metal ($C_{bc}$) whenever the temperature is below the critical temperature ($T_c$), wherein the value $t_m$ is the minimum time to produce $C_o < C_{oc}$ and $C_b < C_{bc}$ for all temperatures less than $T_c$ or times greater than $t_c$ where:

$$t_c = (T_m - T_o)/R_T + t_m + (T_m - T_c)/R_T \qquad (1)$$

The total outgassing time ($t_g$) is given by:

$$t_g = (T_m - T_o)/R_T + t_m + (T_m - T_a)/R_T \qquad (2)$$

In this procedure, the parameters $T_o$, $T_m$, $T_c$, $T_a$, $P_o$, $C_{oc}$ and $C_{bc}$ are characteristic of vessel process conditions, construction features and material properties; they must be obtained from other requirements which impose thermal, mechanical, chemical and metallurgical constraints. These parameters are predetermined by overall process conditions. The parameters $R_T$ and $t_m$ are computed by the outgassing procedure.

The most preferred approach to calculating $R_T$ and $t_m$ comprises the following iterative steps:

Select plausible temperature-time and pressure-time profiles.

Compute the consequences of these assumed profiles.

Make appropriate corrections.

Continue the process until satisfactory profiles are obtained.

EXAMPLE

The following example illustrates the process of the invention. To preclude the need for iteration in this example, the temperature-time and pressure-time profiles selected as plausible are, in fact, the optimum profiles for this particular problem.

The vessel wall consists of 25.95 cm of 2¼Cr-1 Mo alloy base-metal with 0.75 cm of Type 347 stainless steel weld overlay on the base-metal ID. The base-metal OD is covered with 15.2 cm of insulation. In summary:

| Base-Metal Thickness | 25.95 cm |
|---|---|
| Overlay Thickness | 0.75 cm |
| Insulation Thickness | 15.2 cm |

The normal operating temperature of the vessel is 700° K. but the vessel can be heated to 750° K. for outgassing. The critical temperature is 425° K. while ambient temperature is 300° K. Hydrogen partial pressure under normal operating conditions is 144 Bar. The hydrogen concentration in overlay, at the base-metal overlay interface, must not exceed 50 ppm whenever the temperature is less than 425° K. Similarly, the hydrogen concentration at each point in the base-metal must not exceed 2.7 ppm whenever the temperature is less than 425° K. In summary:

| | |
|---|---|
| $T_o$ | 700° K. |
| $T_m$ | 750° K. |
| $T_c$ | 425° K. |
| $T_a$ | 300° K. |
| $P_o$ | 144 Bar |
| $C_{oc}$ | 50 ppm |
| $C_{bc}$ | 2.7 ppm |

The following temperature-time and pressure-time profiles, with associated $R_T$ and $t_m$, were selected for programmed iterative calculation:

TABLE 1

TRIAL TEMPERATURE-TIME AND PRESSURE-TIME PROFILES

| Time (hr) | 0 | 2 | 30 | 48 | 96 |
|---|---|---|---|---|---|
| Temperature (°K.) | 700 | 750 | 750 | 300 | 300 |
| Pressure (bar) | 144 | 0 | 0 | 0 | 0 |
| $R_T$ (°K./hr) | 25 | | | | |
| $t_m$ (hr) | 28 | | | | |

HEATING TO OUTGASSING TEMPERATURE

The objective of this step is to raise the temperature of the vessel wall ID from 700° K. to 750° K. at the maximum rate possible consistent with the constraint that thermal stresses must not exceed an acceptable level. This could be accomplished by conducting a thermal stress analysis of the vessel over a range of heating rates. The present method accomplishes this objective by selecting a heating rate which produces a certain temperature differential across the vessel wall. Given a nominal ten inch, low-alloy steel wall, for example, thermal stress analyses and practical experience may have shown that a 40° K. maximum temperature differential from overlay ID to base-metal OD is acceptable from the standpoint of thermal stress. The trial temperature-time profile given in Table 1 produced the curves in FIG. 1. At the end of the two hour warm-up period, the temperature differential from metal ID to OD was approximately −30° K. After thirteen and eighteen hours of cool-down, the temperature differential was about +40° K. Consequently, the trial value of $R_T=25°$ K./hr is a good practical maximum cooling and heating rate. Values of $R_T$ greater than 25° K./hr would produce a temperature differential greater than +40 K during cool-down.

The curves in FIG. 1 were generated by a finite element computer program which solves the time-dependent Fourier Heat Conduction Equation. These curves are representative of the trial temperature-time profile in Table 1 and the heat transfer parameters in Table 2.

TABLE 2

HEAT TRANSFER PARAMETERS

| | Density (g/cm³) | Specific Heat (Btu/g-K.) | Conductivity (Btu/hr-cm-K.) |
|---|---|---|---|
| Overlay | 8.01 | 4.75 E-4 | 0.495 @ 273 K. |
| | | | 0.757 @ 773 K. |
| Base Metal | 7.85 | 6.03 E-4 | 1.0 @ 273 K. |
| | | | 1.0 @ 773 K. |
| Insulation | 0.48 | 9.12 E-4 | 0.0059 |

The insulation OD was maintained at 300° K. throughout. The analysis which produced the results in FIG. 1 did not include the concept of film coefficients at the boundaries; however, the inclusion of film coefficients can be handled in a trivial manner.

Hydrogen Depressurization

The hydrogen partial pressure must be reduced from 144 bar to zero at an average rate equal to or greater than $P_oR_T/(T_m−T_o)=(14-4bar)(25K/hr)/(750K−700K)=72$ bar/hr. At high temperatures, if hydrocarbon feed rate is maintained but hydrogen partial pressure is reduced to zero, coke will most likely form on the catalyst. Conversely, if hydrogen partial pressure is maintained to prevent coke formation while hydrocarbon is purged from catalyst (for an extended period) with the intent of lowering hydrogen partial pressure after the purge, chemical reduction of the catalyst pre-sulfide layer will probably result. To put this problem is perspective, it is appropriate to review the operational conditions requiring hydrogen depressurization.

Oxidative Regeneration

Outgassing requirements are frequently incorporated into oxidative regeneration procedures. However, if carried out according to the following steps, oxidative regeneration of the catalyst can be achieved without the need for outgassing the reactor wall.

1. While maintaining the operating temperature ($T_o$), switch reactor feed to lighter, more stable material which will displace and flush-out the heavy, labile, coke-forming compounds. The latter compounds are absorbed on the catalyst at the operating temperature. Light, stable stocks appropriate for this application, include light distillate, kerosene, heavy naphtha and heavy reformate. Heavy reformate is a particularly effective flushing agent; however, to avoid excessive hydrogenation, the hydrogen partial pressure is preferably reduced to about 70 bar before heavy reformate is fed to the reactor. To conserve these light stocks, the space velocity can be reduced to below 0.5 LHSV although a correspondingly longer time will be required to flush the reactor. To reduce the time required for purging, the space velocity of the light stock should be kept high and 1 to 5 LHSV is preferred. The quantity of light stock required to flush the reactor is at least 1 bed volume, while 2 to 50 bed volumes are preferred and 4 to 20 bed volumes are more preferred.

2. Subsequent to Step 1, stop the flow of light stock but continue the hydrogen purge while cooling to a temperature no lower than $T_c+25°$ K. and preferably above 500° K.

3. Subsequent to Step 2, stop the flow of hydrogen. Introduce oxygen and increase temperature to initiate oxidative regeneration. Catalyst regeneration can then proceed using a conventional procedure.

Restreaming Active Catalyst at Turn-around and Discharging Spent Catalyst

Both the restreaming of active catalyst at turn-around and the discharging of spent catalyst must be preceded by a cooling of the vessel wall to ambient temperature. The present invention decreases the time required to reach ambient temperature prior to either restreaming or discharge. Avoiding catalyst coking during hydrogen depressurization is advantageous even if the ultimate aim is merely to discharge spent catalyst. Coking will produce catalyst agglomeration which can complicate the discharge process.

According to step (c) of the outgassing procedure, hydrogen depressurization from operating pressure must take place at an average rate equal to or greater than $P_oR_T/(T_m-T_o)$ while the vessel ID is being heated from $T_o$ to $T_m$. In the sample problem the minimum average rate is 72 bar/hr over a period of two hours. This objective can be accomplished by means of the following steps which are concurrent with increasing the temperature from $T_o$ to $T_m$. It should be noted that, in general, conservation of light stock is less important than rapid outgassing.

1. If $P_o > 70$ bar, as in the sample problem, rapidly reduce hydrogen partial pressure to 70 bar then begin a linear depressurization with time from 70 bar to zero. If $P_o < 70$ bar, then begin a linear depressurization with time from $P_o$ to zero. The total depressurization time must not exceed $(T_m - T_o)/R_T$ which is two hours in the sample problem. Hydrogen flow should be maintained during the depressurization process.

2. Concurrently with the beginning of Step 1, switch reactor feed to heavy reformate which-will displace and flush-out the heavy, labile, coke-forming compounds; the value of LHSV should be sufficient to achieve four bed volumes of flushing by the time the temperature reaches $T_m$. In the sample problem, the allowed depressurization time is two hours which would require a LHSV value of 2.0/hr. When the temperature reaches $T_m$, 750° K. in the sample problem, the reactor will have received four bed-volumes of flushing, and the hydrogen partial pressure will have dropped to zero.

After hydrogen depressurization, flushing should continue with either heavy reformate or heavy naphtha for the remainder of the outgassing time; the LHSV can be reduced to less than 0.5/hr for conservation of light stock if desired. Continued flow of light hydrocarbon is necessary to control the cooling rate of the reactor ID to the required value of 25° K./hr. Finally, either spent catalyst should be discharged or, following turn-around activities, active catalyst should be restreamed in a conventional way.

Cooling to Ambient Temperature

The objective of this step is to lower the temperature of the vessel wall ID to 300° K. after 28 hours of isothermal outgassing at 750° K. The cooling rate for the present Example will be $R_T = 25°$ K./hr since a higher rate would produce unacceptable levels of thermal stress. The value $t_m = 28$ hr was a value selected as a trial minimum required to produce $C_o < 50$ ppm and $C_b < 2.7$ ppm for all temperatures less than $T_c = 425°$ K. or, equivalently, times greater than $t_c = 43$ hr. The trial temperature-time and pressure-time profiles given in Table 1 produced the curves in FIGS. 2 and 3. According to FIG. 2, for all times greater than 43 hours, the hydrogen concentration in the overlay, at the base-metal/overlay interface is less than 50 ppm. Similarly, FIG. 3 shows the maximum hydrogen concentration in the base-metal is slightly less than 2.7 ppm after 43 hr and decreases thereafter. Consequently, the trial temperature-time and pressure-time profiles in Table 1 are, in fact, the optimum profiles. In this particular example, the constraint $C_b < C_{bc}$ for all temperatures less than 425° K. can only be met by setting $t_m$ equal to 28 or more hours. The constraint $C_o < C_{oc}$ could have been satisfied by a slightly smaller value of $t_m$.

Figure 2:
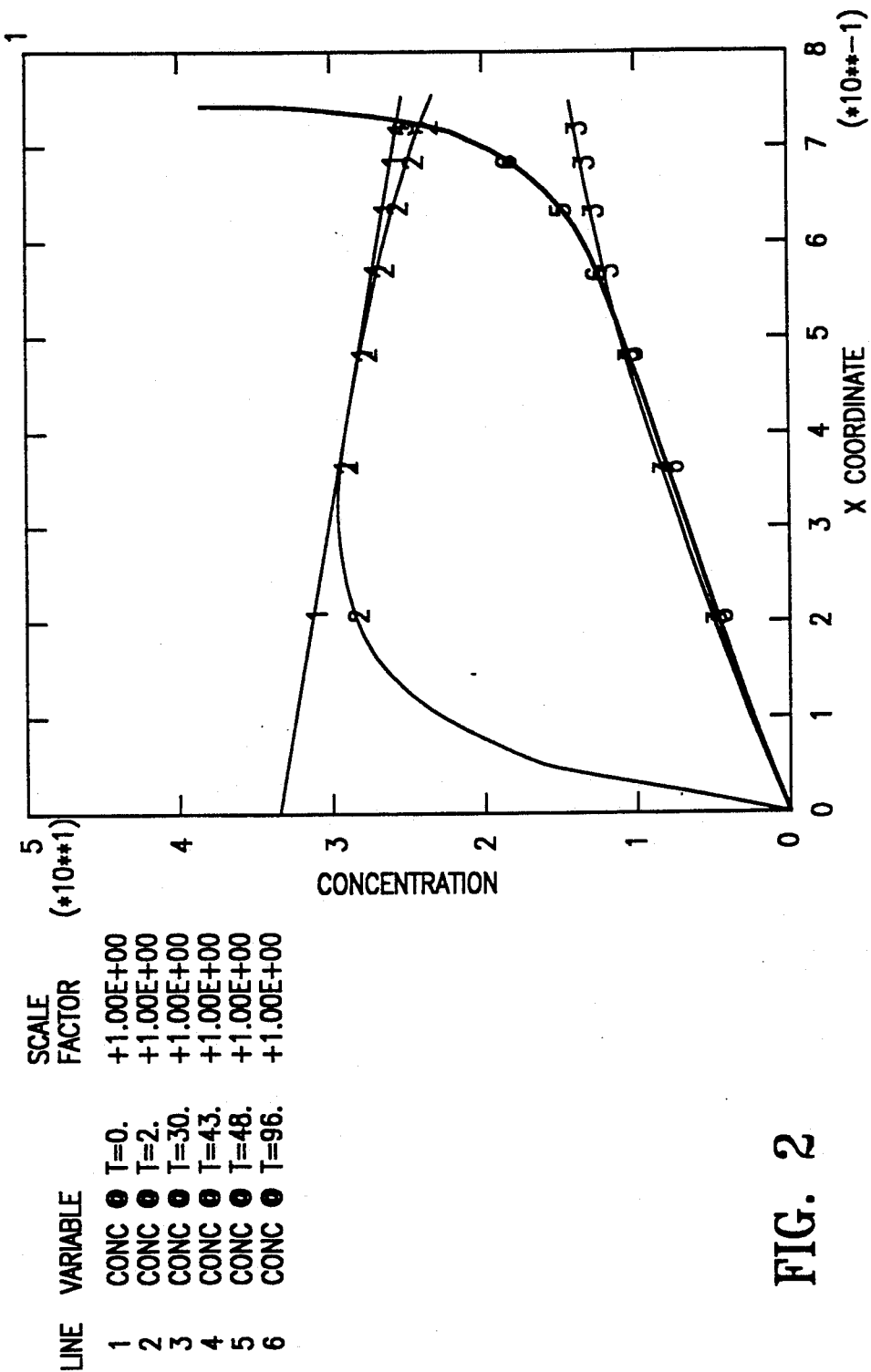
FIG. 2 is a plot of the hydrogen concentration in ppm (weight) in the overlay (the y-axis) as a function of the radial depth in the overlay (cm) for the trial temperature-time profile given in Table 1, with the intersection of the x- and y- axes representing the inside diameter of the overlay.
Figure 3:
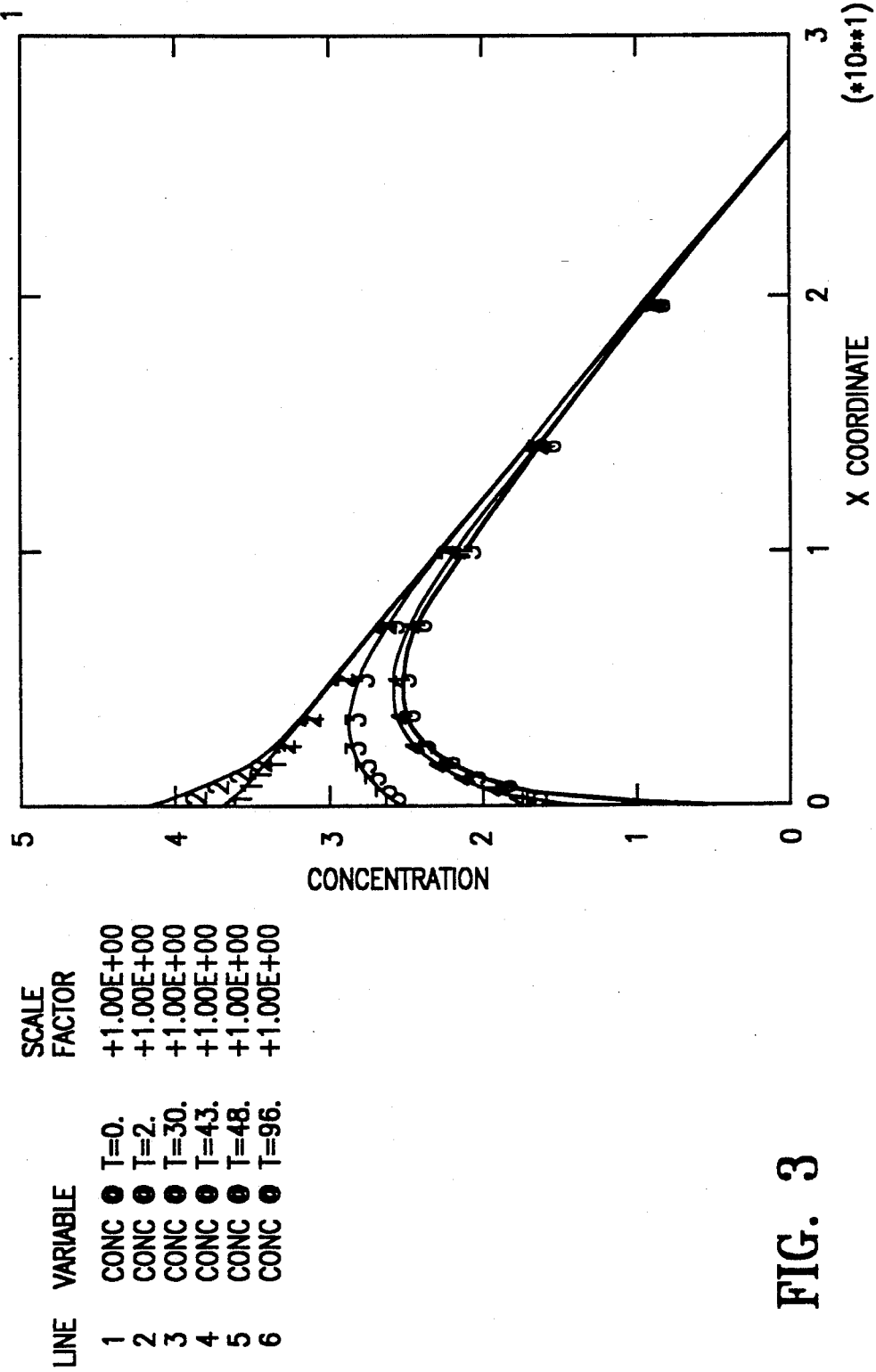
FIG. 3 is a plot of the hydrogen concentration in ppm (weight) in the base metal (the y-axis) as a function of the radial depth in the base metal (cm) for the trial temperature-time profile given in Table 1, with the intersection of the x- and y- axes representing the base metal/overlay interface.

The curves in FIGS. 2 and 3 were generated by a finite element computer program which solves the diffusion equation for systems containing an interface between dissimilar materials. These curves are representative of the trial pressure-time and temperature-time profiles in Table 1 and the diffusion parameters in Table 3.

TABLE 3

| | Diffusion Parameters | |
|---|---|---|
| | Solubility (ppm/bar$^{\frac{1}{2}}$) | Diffusivity (cm$^2$/hr) |
| Overlay | 12.88 exp(−1078/T) | 93.1 exp(−6767/T) |
| Base-Metal | 43.0 exp(−3261/T) | $\dfrac{2.74 \exp(-1157/T)}{1 + (0.00105)\exp(3573/T)}$ |

The base-metal OD was maintained at zero bar hydrogen pressure throughout.

Basis of Diffusion Calculation

The heat transfer computation was straight-forward since temperature is believed to be continuous across the overlay/base-metal and base-metal/insulation interfaces. However, the concentration of hydrogen is believed to be discontinuous across the overlay/base-metal interface. The theoretical basis for the calculation of hydrogen concentration is set forth herein, however, no theoretical explanation set forth herein should be considered as limiting the scope of the present invention, which is defined solely by the appended claims.

In systems comprised of two dissimilar metals joined at an interface, the time dependent diffusion equation (Fick's Equation) must be satisfied throughout the bulk phases of each-metal. Secondly, if the interface is fixed, the normal mass flux must have the same value on both sides of this fixed interface. These two conditions represent the standard mass balance requirements of continuum mechanics. A third requirement is based on the assumption that chemical equilibrium is maintained locally at the interface. This means the chemical potential of dissolved hydrogen must be the same on one side of the interface as it is on the other. This chemical potential can be expressed as the sum of a standard chemical potential and the term RT ln C as indicated in Equation (3):

$$\mu_m = \mu_{om}(T,P) + RT \ln C \quad (3)$$

C is the concentration of dissolved hydrogen in the metal, R is the gas constant, T is the temperature and P is the partial pressure of gaseous hydrogen external to the metal. The "standard" chemical potential ($\mu_{om}$) is a generally unknown function of temperature and hydrogen partial pressure.

Thermodynamic equilibrium between gaseous hydrogen and dissolved hydrogen can be expressed by $$(\tfrac{1}{2})H_2(\text{gas}) = H(\text{dissolved}) \quad (4)$$

and requires satisfaction of $$\mu_m = (\tfrac{1}{2})\mu_g \quad (5)$$

where $\mu_g$ is the chemical potential of gaseous hydrogen. If the gaseous hydrogen is viewed as one component of a "perfect" gas mixture then $\mu_g$ can be defined as $$\mu_g = \mu_{og}(T) + RT \ln P \quad (6)$$

Substituting Equations (3) and (6) into Equation (5) yields $$RT \ln(C/P^{\frac{1}{2}}) = -[\mu_{om} - (\tfrac{1}{2})\mu_{og}] \quad (7)$$

The quantity $C/P^{\frac{1}{2}}$ is defined as the equilibrium constant or "solubility" (s) where $$s = \exp\{-[\mu_{om} - (\tfrac{1}{2})\mu_{og}]/RT\} \quad (8)$$

If Equation (3) is written as $$\mu_m = \mu_{om} + RT \ln[s(C/s)] \quad (9)$$

then, with the help of Equation (8), it reduces to $$\mu_m = (\tfrac{1}{2})\mu_{og} + RT \ln(C/s) \quad (10)$$

According to Equation (10), interfacial chemical equilibrium will be achieved when the quantity C/s is the same on both sides of the overlay/base-metal interface. The requirement that C/s and not C be continuous across the interface is believed to have given rise to account for the movement of hydrogen from ferritic base metal to austenitic overlay during cool-down of high-temperature, high-pressure hydroprocessing equipment.

Finite element software was developed to solve the standard equations of mass balance with the added condition that C/s must have the same local value on both sides of the interface. This software was developed by Hibbitt, Karlsson & Sorensen Inc., Pawtucket, R.I. in collaboration with Mobil Research and Development Corporation. The software is called the Diffusion Module of ABAQUS and is commercially available from Hibbitt, Karlsson & Sorensen Inc., Pawtucket, R.I.

Changes and modifications in the specifically described embodiments can be carried out without departing from the scope of the invention which is intended to be limited only by the scope of the appended claims.

What is claimed is:

1. An outgassing method comprising:
   (a) providing a vessel having a vessel wall fabricated from ferritic base metal which may or may not be overlayed with austenitic alloy, said vessel wall containing diffused hydrogen from contact with a hydrogen-containing reaction mixture at operating temperature $T_o$ and hydrogen partial pressure $P_o$;
   (b) raising the temperature of the inside surface of said vessel from $T_o$ to $T_m$ at rate $R_T$ where $T_m$ is equal to or less than the maximum safe operating temperature for said vessel and $R_T$ is less than the rate of temperature change required to effect mechanical failure of the verritic base metal or the austenitic alloy overlay, if present;
   (c) concurrently with step (b), reducing the hydrogen partial pressure from $P_o$ at an average rate of at least $P_o R_T/(T_m - T_o)$;
   (d) concurrently with steps (b) and (c), flushing said vessel with a hydrocarbon liquid at liquid hourly space velocity (LHSV) sufficient to achieve at least one catalyst bed volume of flushing by the time the temperature reaches $T_m$; and
   (e) maintaining the inside surface of said vessel at temperature $T_m$ for time of about $t_m$ then lowering the temperature of the inside surface from $T_m$ to ambient $T_a$ at rate $R_T$ wherein the value $t_m$ is minimum time to produce $C_o < C_{oc}$ and $C_b < C_{bc}$ for all temperatures less than $T_c$, wherein $C_e$ is the hydrogen concentration in said overlay (if present) at the base-metal/overlay interface, $C_{oc}$ is the critical value for the overlay, $C_b$ is the hydrogen concentration in the base-metal, $C_{bc}$ is the critical value as defined herein for said base-metal, and $T_c$ is the critical temperature as defined herein, with the proviso that if no austenitic alloy overlay is present then only the criterion $C_b < C_{bc}$ is met.

2. The method of claim 1 further comprising controlling the temperature of said vessel by flowing a hydrocarbon fluid through said vessel.

3. The method of claim 1 wherein said vessel contains a hydroprocesing catalyst.

4. The method of claim 3 further comprising controlling temperature by flowing a hydrocarbon fluid through said vessel, said hydrocarbon fluid being substantially inert in the presence of said hydroprocessing catalyst under outgassing conditions.

5. The method of claim 1 wherein said concurrent steps (b) and (c) are initiated substantially simultaneously.

6. The method of claim 1 wherein said concurrent steps (b), (c), and (d) are initiated substantially simultaneously.

7. A method for decreasing the total time required for cooling and outgassing a hydroprocessing reactor from operating conditions to atmospheric conditions comprising the steps of:
   (a) providing a vessel having a vessel wall fabricated from ferritic base metal which may or may not be overlayed with austenitic alloy, said vessel wall containing diffused hydrogen from contact with a hydrogen-containing reaction mixture at operating temperature $T_o$ and hydrogen partial pressure $P_o$;
   (b) raising the temperature of the inside surface of said vessel from $T_o$ to $T_m$ at rate $R_T$ where $T_m$ is equal to or less than the maximum safe operating temperature for said vessel and $R_T$ is less than the rate of temperature change required to effect mechanical failure of the ferritic base metal or the austenitic alloy overlay, if present;
   (c) concurrently with step (b), reducing the hydrogen partial pressure from $P_o$ at an average rate of at least $P_o R_T/(T_m - T_o)$;
   (d) concurrently with steps (b) and (c), flushing said vessel with a hydrocarbon liquid at liquid hourly space velocity (LHSV) sufficient to achieve at least one catalyst bed volume of flushing by the time the temperature reaches $T_m$; and
   (e) maintaining the inside surface of said vessel at temperature $T_m$ for time of about $t_m$ then lowering the temperature of the inside surface from $T_m$ to ambient $T_a$ at rate $R_T$ wherein the value $t_m$ is minimum time to produce $C_o < C_{oc}$ and $C_b < C_{bc}$ for all temperatures less than $T_c$, wherein $C_o$ is the hydrogen concentration in said overlay (if present) at the base-metal/overlay interface, $C_{oc}$ is the critical value for the overlay, $C_b$ is the hydrogen concentration in the base-metal, $C_{bc}$ is the critical value as defined herein for said base-metal, and $T_c$ is the critical temperature as defined herein, with the proviso that if no austenitic alloy overlay is present then only the criterion $C_b < C_{bc}$ is met.

8. The method of claim 7 further comprising controlling the temperature of said vessel by flowing a hydrocarbon fluid through said vessel.

9. The method of claim 7 wherein said vessel contains a hydroprocessing catalyst.

10. The method of claim 9 further comprising controlling temperature by flowing a hydrocarbon fluid through said vessel, said hydrocarbon fluid being substantially inert in the presence of said hydroprocessing catalyst under outgassing conditions.

11. The method of claim 7 wherein said concurrent steps (b) and (c) are initiated substantially simultaneously.

12. The method of claim 7 wherein said concurrent steps (b), (c), and (d) are initiated substantially simultaneously.

* * * * *

UNITED STATES PATENT AND TRADEMARK OFFICE
CERTIFICATE OF CORRECTION

PATENT NO. : 5,258,116
DATED : November 2, 1993
INVENTOR(S) : B.D. McLaughlin and T.Y. Yan It is certified that error appears in the above-indentified patent and that said Letters Patent is hereby corrected as shown below:

Column 9, line 49, "verritic" should be —ferritic—.

Column 9, line 63, $C_{bc}$" should be —$C_{bc}$—.

Column 9, line 64, "$C_e$" should be —$C_o$—.

Signed and Sealed this

Thirty-first Day of May, 1994

Attest:

BRUCE LEHMAN

Attesting Officer    Commissioner of Patents and Trademarks